United States Patent
Bi et al.

(10) Patent No.: US 8,344,274 B2
(45) Date of Patent: Jan. 1, 2013

(54) THREE POSITION LOCK DEVICE FOR DRAWOUT CIRCUIT BREAKER

(75) Inventors: Jian Sheng Bi, Shanghai (CN); Yong Qing Ma, Shanghai (CN)

(73) Assignee: Siemens Aktiengesellschaft, Munich (DE)

( * ) Notice: Subject to any disclaimer, the term of this patent is extended or adjusted under 35 U.S.C. 154(b) by 362 days.

(21) Appl. No.: 12/810,640

(22) PCT Filed: Feb. 5, 2009

(86) PCT No.: PCT/CN2009/070362
§ 371 (c)(1),
(2), (4) Date: Jun. 25, 2010

(87) PCT Pub. No.: WO2009/097825
PCT Pub. Date: Aug. 13, 2009

(65) Prior Publication Data
US 2010/0263995 A1    Oct. 21, 2010

(30) Foreign Application Priority Data
Feb. 5, 2008   (CN) .......................... 2008 1 0004869

(51) Int. Cl.
*H02B 11/02* (2006.01)

(52) U.S. Cl. ..................................... 200/50.25; 361/609

(58) Field of Classification Search .... 200/50.21–50.26, 200/50.01, 50.17; 361/605–615
See application file for complete search history.

(56) References Cited

U.S. PATENT DOCUMENTS

| 6,472,620 B2 | 10/2002 | Rane et al. |
| 7,821,775 B2 * | 10/2010 | Narayanasamy et al. . 200/50.24 |
| 7,978,458 B2 * | 7/2011 | Bohnen ...................... 200/50.21 |
| 2001/0022262 A1 | 9/2001 | Rane et al. |

FOREIGN PATENT DOCUMENTS

| CN | 1366726 A | 8/2002 |
| CN | 1402397 A | 3/2003 |
| KR | 20040035174 A | 4/2004 |

OTHER PUBLICATIONS

International Search Report.

* cited by examiner

*Primary Examiner* — Amy Cohen Johnson
*Assistant Examiner* — Marina Fishman
(74) *Attorney, Agent, or Firm* — Harness, Dickey & Pierce, P.L.C.

(57) ABSTRACT

A position locking device is disclosed for a draw-out circuit breaker. In at least one embodiment, the position locking device includes a screw rod, a catching plate, a positioning plate, a locking plate, and a push rod. The screw rod has key ways. The catching plate has a catching plate hole and a protrusion that can be inserted into the key ways. Positioning notches for limiting OFF, TEST, and ON positions of the circuit breaker are formed on the top surface of the positioning plate, and corresponding protruding platforms are disposed on the bottom surface. One end of the locking plate bears against the bottom surface of the positioning plate, and the other end is locked to or unlocked from an outward protruding platform of the catching plate. One end of the push rod passes through the catching plate hole, and has an inclined surface. When the push rod is pushed, the inclined surface makes the catching plate leave the key ways. The position locking device is structurally simple and reasonable, secure, reliable, and convenient to operate. The cost for manufacturing, installing or maintaining the device is lowered.

9 Claims, 5 Drawing Sheets

THREE POSITION LOCK DEVICE FOR DRAWOUT CIRCUIT BREAKER

PRIORITY STATEMENT

This application is the national phase under 35 U.S.C. §371 of PCT International Application No. PCT/CN2009/070362 which has an International filing date of Feb. 5, 2009, which designates the United States of America, and which claims priority on Chinese patent application number CN 200810004869.8 filed Feb. 5, 2008, the entire contents of each of which are hereby incorporated herein by reference.

FIELD OF INVENTION

At least one embodiment of the present invention relates to a draw-out circuit breaker, in particular to a position locking device for a circuit breaker capable of locking a position.

BACKGROUND

In a circuit breaker, an off state, a test state, an on state and the like are quite important. When the circuit breaker is in these states, a draw-out functional unit must be locked after being positioned and is not allowed to be drawn out or moved, and cannot be moved from one position to another position, that is, the position must be locked.

While a driving lead screw travels from one of the off, test, and on positions to another position, a locking, unlocking, and lock waiting process is required. China Patent No. CN1402397A discloses a locking device for a draw-out circuit breaker, which provides a device capable of locking under the three different states of off, test, and on. In the patent, this function is achieved through a cooperation of a plurality of members, that is, a fork shaft and an unlocking shaft, a locking sheet and a roller thereon, a slot and a roller slot on a square shaft, and a locking trench on a catching plate.

In the position locking device for the circuit breaker, many members are required to realize position locking and unlocking, and the mutual traveling relation thereof is complicated.

SUMMARY

At least one embodiment of the present invention is directed to a position locking device for a draw-out circuit breaker, which is structurally simple, reliable, convenient to operate, and can prevent mis-operation, and lowers a cost for manufacturing, installing, and maintaining the device.

Accordingly, at least one embodiment of the present invention provides a position locking device for a draw-out circuit breaker, which includes a rotatable screw rod, a catching plate, and a positioning plate. The screw rod has one end driving a drag plate, and has at least two key ways; the catching plate has a catching plate hole and a protrusion inserted into the key ways, and is connected to a fixing plate through a tension mechanism; the positioning plate has one end inserted into the catching plate hole and the other end connected to the drag plate, such that the positioning plate can be driven to travel by the drag plate, in which at least two positioning notches are formed on a top surface of the positioning plate. The position locking device further includes a push rod. The push rod has a restoring mechanism, has one end disposed on a panel of the circuit breaker and the other end inserted into the catching plate hole, and has an inclined surface. When the push rod is pushed from the end disposed on the panel along an axial direction, the inclined surface makes the catching plate travel along a direction in which the protrusion exits from the key ways. The catching plate further includes an outward protruding platform, and the catching plate hole further includes a first inward protruding platform bearing against the top surface of the positioning plate and a second inward protruding platform bearing against the positioning notches of the positioning plate.

Further, in at least one embodiment, the position locking device also includes a locking plate. The locking plate is connected to the fixing plate through a rotating mechanism, in which a top surface of a first end of the locking plate bears against a bottom surface of the positioning plate, and a second end bears against the outward protruding platform; further protruding platforms corresponding to the positioning notches are disposed on the bottom surface of the positioning plate, such that when one of the positioning notches is in the catching plate hole, the corresponding protruding platform presses the first end of the locking plate, and the second end of the locking plate leaves the outward protruding platform of the catching plate and when the positioning notches leave the catching plate hole, the first end of the locking plate is raised by the leaving from the protruding platform, such that the second end of the locking plate bears against the outward protruding platform of the catching plate.

In an embodiment of the present invention, the restoring mechanism of the push rod is a spring, and the push rod returns to an initial position under an acting force of the spring.

In an embodiment of the present invention, the tension mechanism of catching plate is a spring, and the catching plate travels under an acting force of the spring along a direction in which the protrusion is inserted into the key ways.

In the position locking device for the circuit breaker of at least one embodiment of the present invention, the position locking is realized mainly through engagement between the screw rod, the catching plate, the positioning plate, and the push rod, wherein fewer members are required, and the mutual traveling relation is simple. In addition, utilizing the engagement between the locking plate and the protruding platforms corresponding to the positioning notches and disposed on the bottom surface of the positioning plate, locking and unlocking can be performed more accurately, thereby preventing the mis-operation. Thus, at least one embodiment of the present invention is structurally simple, reliable, and convenient to operate, and prevents the mis-operation, and lowers the cost for manufacturing, installing, and maintaining the device.

BRIEF DESCRIPTION OF THE DRAWINGS

The present invention will become more fully understood from the detailed description of example embodiments given herein below for illustration only, and thus are not limitative of the present invention, and wherein.

DETAILED DESCRIPTION OF THE EXAMPLE EMBODIMENTS

Figure 1:
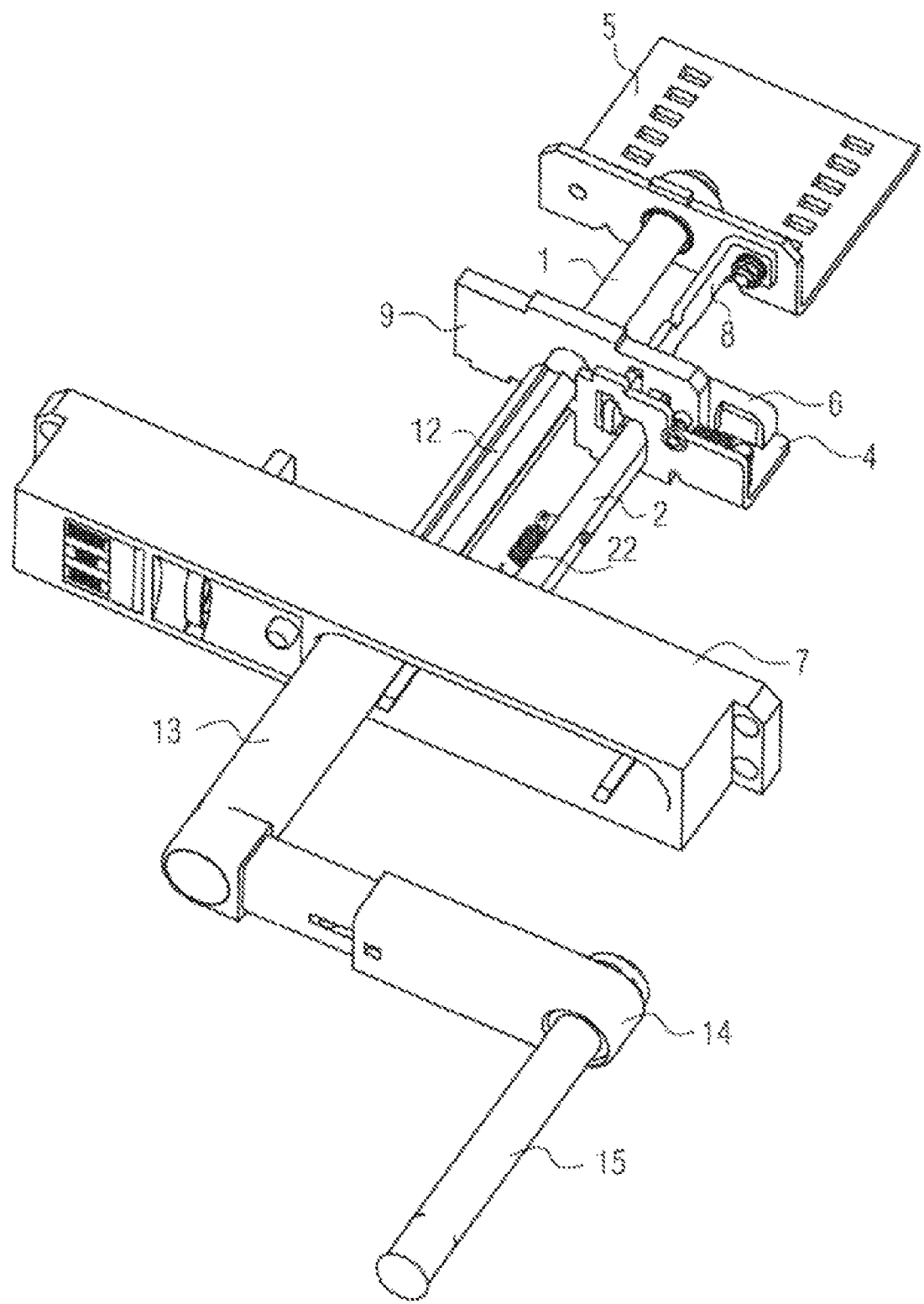
FIG. 1 is a schematic view of a mutual relation of an operating mechanism and a position locking device for a draw-out circuit breaker according to an embodiment of the present invention.

In order to make the technical features, objectives, and efficacies of the present invention more comprehensible, a detailed description of embodiments is given below in conjunction with the drawings in which the same member has the same reference numeral.

Figure 2:
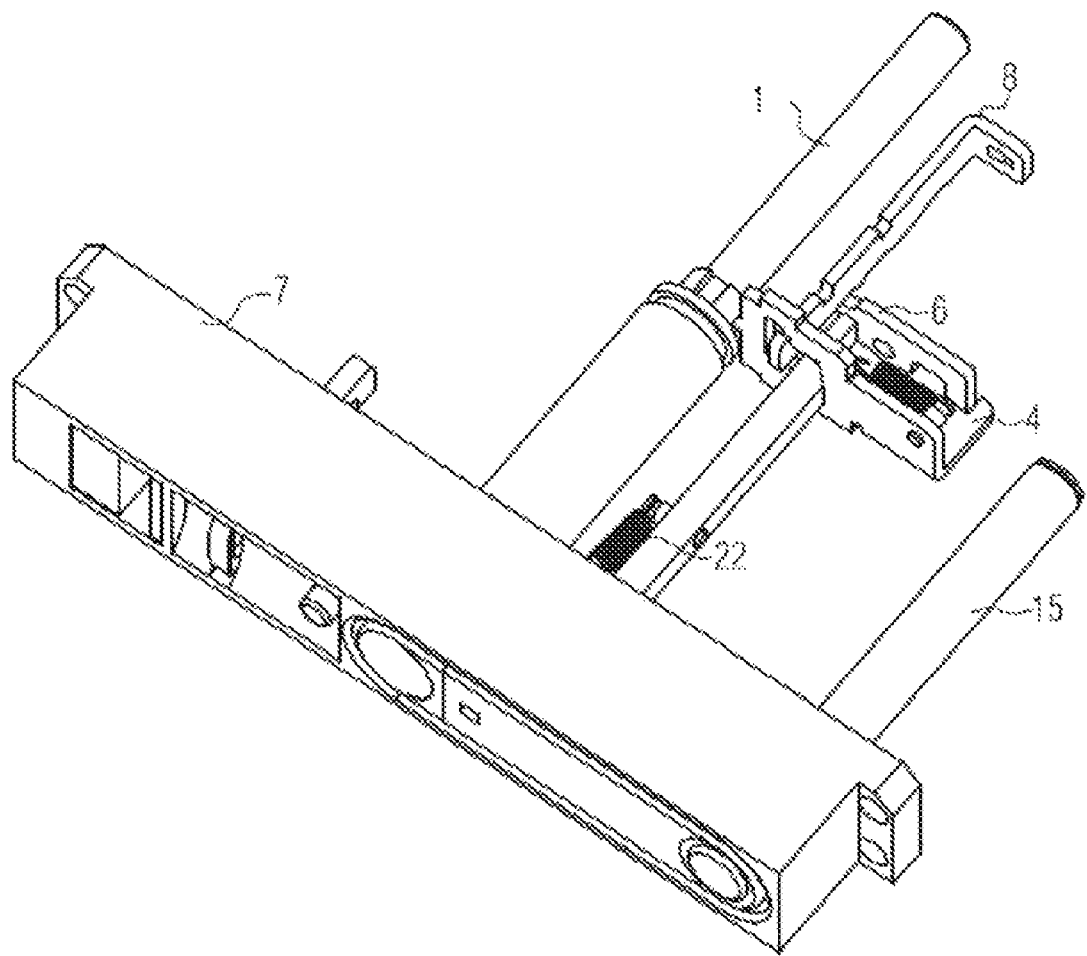
FIG. 2 is a schematic view of the operating mechanism of the draw-out circuit breaker having the position locking device of an embodiment of the present invention in a received position.

FIG. 1 shows an operating mechanism of a circuit breaker and a position locking device of an embodiment of the present invention. The operating mechanism of the circuit breaker includes a handle 15, a rocking handle 14, a crank 13, and a rocking handle case 7. The handle may move on one end of the rocking handle; the crank 13 is disposed on the other end of the rocking handle 14; the rocking handle case 7 (see FIG. 2) receives the rocking handle 14 and the handle 15, the crank 13 passes through the rocking handle case 7 in which a screw rod 1 passes through the crank 13 and a fixing plate 9 of the circuit breaker, and has another end connected to a drag plate 5 of the circuit breaker. An operator may rotate the handle 15 clockwise around the crank 13 to move the drag plate 5 forwards, or may rotate the handle 15 anticlockwise to move the drag plate 5 backwards. If the circuit breaker is in the off position, the handle 15 can only rotate clockwise; if the circuit breaker is in the on position, the handle 15 can only rotate anticlockwise; if the circuit breaker is in any other position, the position handle 15 can rotate clockwise or anticlockwise. The screw rod 1 has at least two key ways 12 and a protrusion 41 of the catching plate 4 can be inserted to the key ways, so as to limit the rotation of the screw rod 1 and to lock the circuit breaker in a determined position. FIG. 2 is a schematic view of the operating mechanism of the draw-out circuit breaker having the position locking device of the present invention in a received position.

Figure 3:
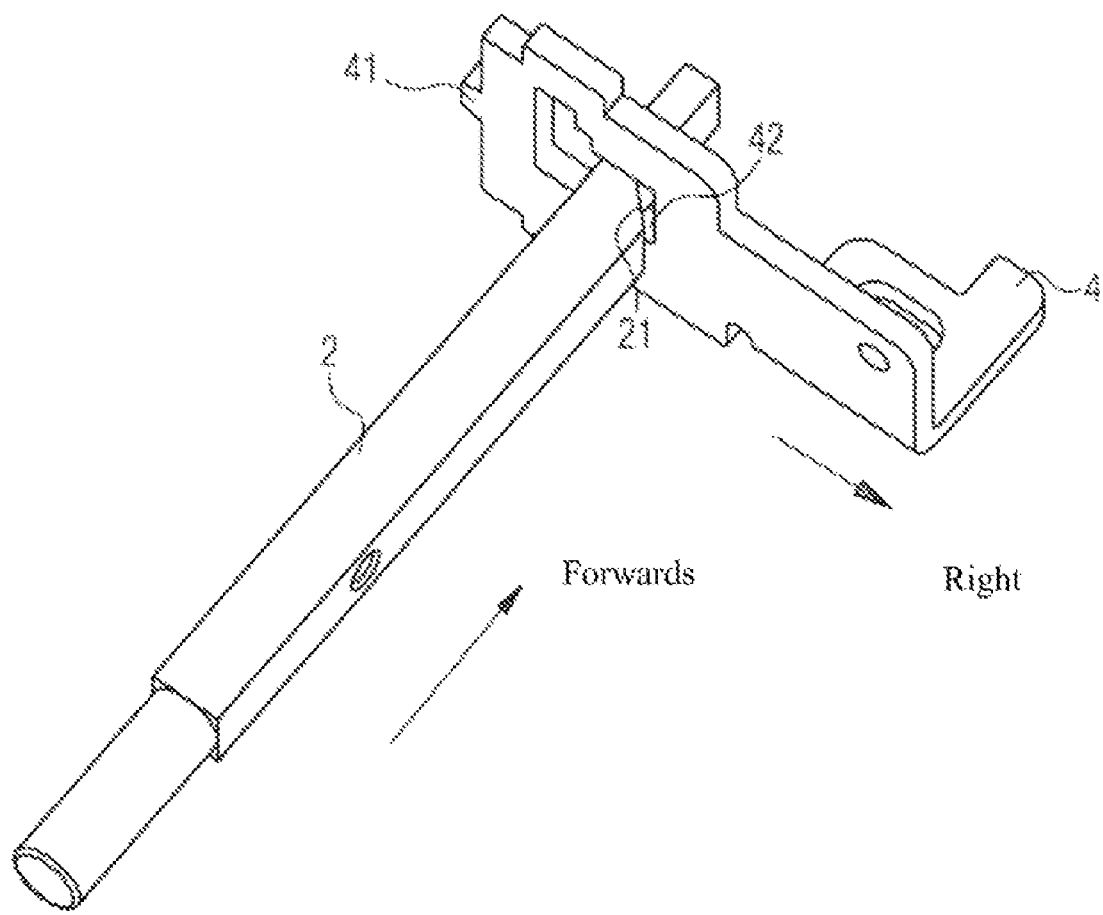
FIG. 3 is a schematic view of a mutual relation of a push rod and a catching plate.

FIG. 3 is a schematic view of a mutual relation of a push rod and a catching plate. One end of the push rod 2 is disposed in a position of a panel of the circuit breaker, such that the operator may push the push rod 2 as desired to realize the unlocking. For example, in an embodiment of the present invention, one end of the push rod 2 is connected to the rocking handle case 7 through a spring 22 (see FIGS. 1 and 3), in which the rocking handle case 7 is disposed on the panel of the circuit breaker; and the other end of the push rod 2 is inserted into a catching plate hole 42 of the catching plate 4, and the contact surface of the push rod 2 and the catching plate hole 42 is an inclined surface 21. Pushing the push rod 2, the inclined surface 21 pushes the catching plate 4 towards a direction away from the screw rod 1. One end of the catching plate 4 contacting the screw rod 1 has a protrusion 41 which leaves the key ways 12 of the screw rod 1 when the catching plate 4 travels towards right.

Figure 4:
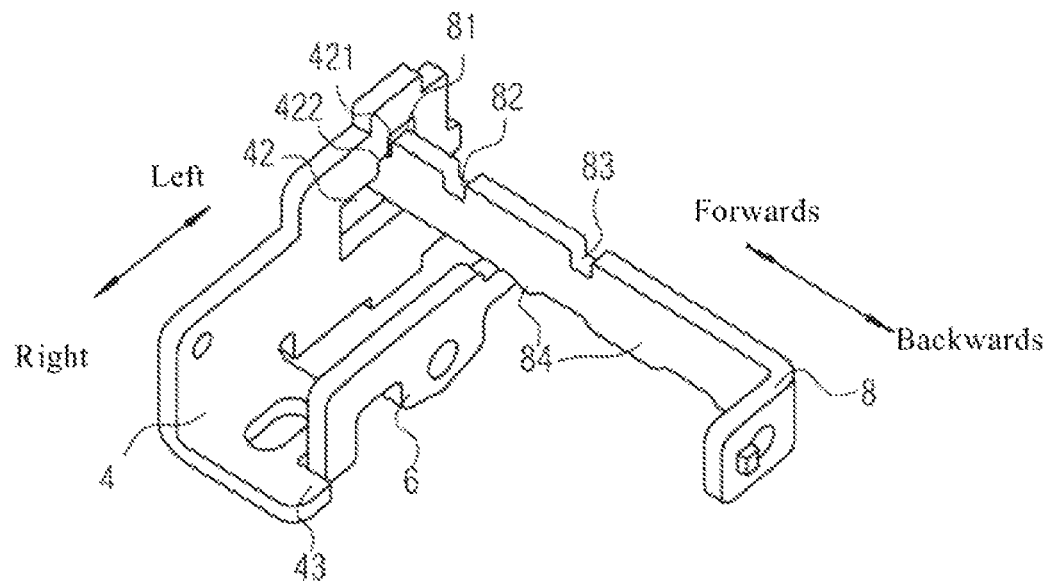
FIG. 4 is a schematic view of a position that when a positioning plate just leaves an off notch and a locking plate is in a locking state.
Figure 5:
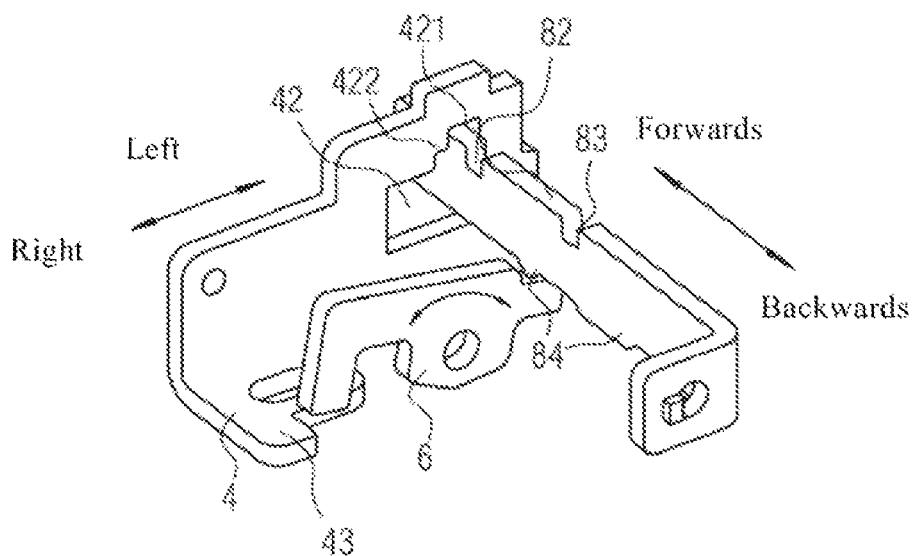
FIG. 5 is a schematic view of a position that when the positioning plate is about to enter an on notch and the locking plate is in an unlocking state.
Figure 6:
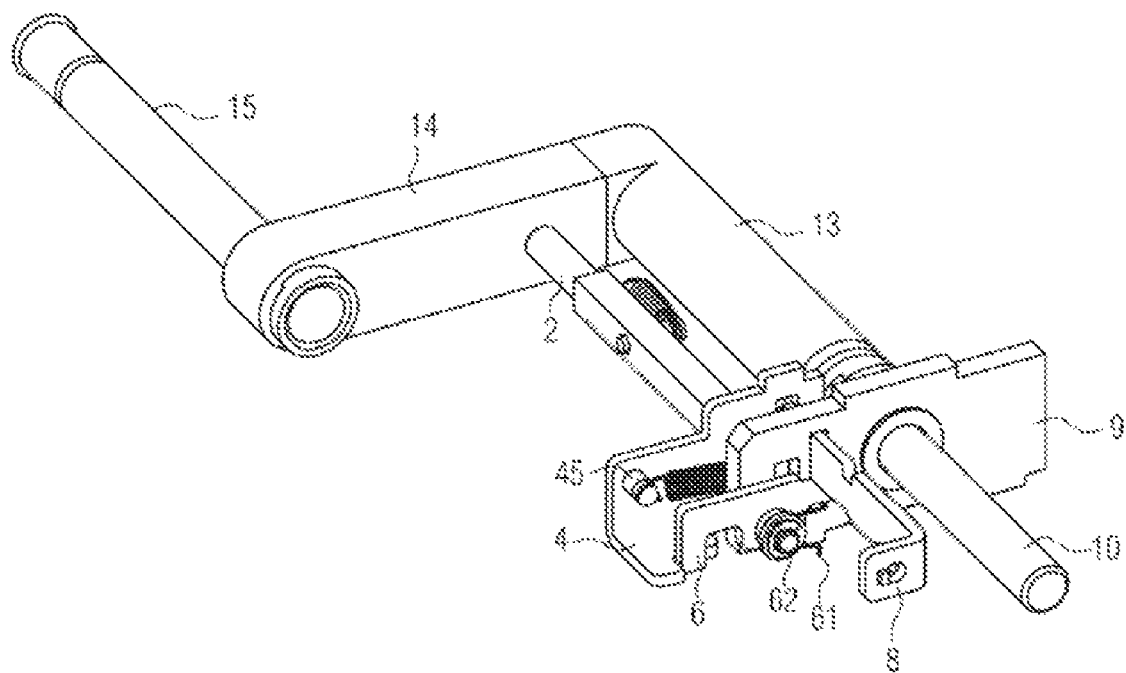
FIG. 6 is a schematic view of the locking plate of an embodiment of the present invention in the locking state.

FIGS. 4 and 5 show the mutual relation of the positioning plate 8, the catching plate 4, and the locking plate 6 while the circuit breaker travels from the off position to the on position. In order to clearly show the relation of them, members, for example the fixing plate 9, are omitted in FIGS. 4 and 5. As shown in the drawings, three positioning notches, namely an off notch 81, a test notch 82, and an on notch 83, corresponding to the off, test, and on positions of the circuit breaker respectively are disposed on a top surface of the positioning plate 8; and two protruding platforms 84 corresponding to the off notch 81, the test notch 82, and the on notch 83 are disposed on a bottom surface of the positioning plate 8. The catching plate hole 42 of the catching plate 4 has a first inward protruding platform 421 and a second inward protruding platform 422. When the off notch 81, the test notch 82, or the on notch 83 of the positioning plate 8 is in the catching plate hole 42, the second inward protruding platform 422 can bear against the notch, so as to ensure that the positioning plate 8 cannot move in the positions. When the positioning notches of the positioning plate 8 leave the catching plate hole 42, the first inward protruding platform 421 can bear against the top surface of the positioning plate 8, such that the positioning plate 8 moves. According to the position and shape of the protruding platform 84 on the bottom surface of the positioning plate 8, the locking plate 6 can rotate around a pivot 62 during the travel of the positioning plate 8 (see FIG. 6), and can match with the positioning notches of the positioning plate 8, so as to unlock or lock at an outward protruding platform 43 of the catching plate 4.

Referring to FIGS. 4 and 5, a detailed operation of the position locking device of the present invention during the movement of the circuit breaker from the off position to the test position is described. FIG. 4 shows a situation where the circuit breaker is about to leave the off position. To make the circuit breaker leave the off position, firstly the push rod 2 is pushed forwards, the catching plate 4 moves towards right (see arrows in FIG. 3), and the protrusion 41 of the catching plate 4 leaves the key ways 12; at the same time, the off notch 81 of the positioning plate 8 also leaves the second inward protruding platform 422 of the catching plate hole 42, and the top surface of the positioning plate 8 contacts the first inward protruding platform 421 of the catching plate hole 42.

When the screw rod 1 rotates clockwise, the positioning plate 8 travels forwards, and meanwhile, under the function of a rotating mechanism, for example, a torsion spring 61 (referring to FIG. 6), the locking plate 6 locks the outward protruding platform 43 of the catching plate 4 downwards. Here, even if the catching plate 4 is forced by a left tension force of the spring 45, the catching plate 4 is stopped from moving towards left, thereby ensures that the circuit breaker keeps in the unlocking state. As the screw rod 1 rotates clockwise, the drag plate 5 travels forwards, and the positioning plate 8 also travels forwards.

In an embodiment of the present invention, the push rod 2 may restore an original position through a restoring mechanism, for example, the spring 22 (see FIG. 1), so as to restore the position in the rocking handle case 7 after one unlocking operation and to be ready for the next unlocking.

As shown in FIG. 5, as the drag plate 9 travels forwards, the protruding platform 84 on the bottom surface of the positioning plate 8 presses one end of the locking plate 6, under the function of the rotating mechanism, for example, the torsion spring 61, the end of the locking plate 6 that bearing against the outward protruding platform 43 rises and leaves the catching plate 4. When the positioning plate 8 travels forwards to the test notch 82 on the positioning plate 8 and just enters the catching plate hole 42 of the catching plate 4, the catching plate 4 moves towards left under the function of the tension mechanism, for example, the tension spring 45. The second inward protruding platform 422 bears against the test notch 82, and the protrusion 41 of the catching plate 4 is again inserted into the key ways 12 of the screw rod 1, so the screw rod 1 cannot rotate, thereby positioning the circuit breaker at the test position.

Similarly, when the circuit breaker is about to leave the test position, it should be firstly unlocked. The push rod 2 is pushed forwards again, the catching plate 4 moves towards right under the function of the inclined surface 21 of the push rod 2, the protrusion 41 of the catching plate 4 leaves the key ways 12 of the screw rod 1. Here, the screw rod 1 can rotates clockwise and drives the drag plate 5 and the positioning plate 8 to travel forwards, or the screw rod 1 rotates anticlockwise and drives the drag plate 5 and the positioning plate 8 to travel backwards. The catching plate 2 travels towards right, so that the test notch 82 can disengage from the contact with the second inward protruding platform 422.

No matter whether the positioning plate 8 travels forwards or backwards, the test notch 82 passes the first inward protruding platform 421 of the catching plate hole 42, and makes the top surface of the positioning plate 8 bear against the inward protruding platform 421. At the same time, the end of the locking plate 6 pressed under the positioning plate 8 passes the protruding platform 84 under the positioning plate 8, thereby the end of the locking plate 6 rises; and under the function of the torsion spring 61, the other end of the locking plate 6 locks the outward protruding platform 43 of the catching plate 4 downwards, so as to release the locking of the screw rod 1 performed by the catching plate 4. Then, the screw rod 1 can rotate clockwise or anticlockwise to drive the drag plate 9 forwards or backwards, and the positioning plate 8 also travels forwards or backwards.

When the positioning plate 8 moves forwards to the position of the on notch 83, the protruding platform 84 of the positioning plate 8 presses one end of the locking plate 6, such that the locking plate 6 is disengaged from the contact with the protruding platform 43 of the catching plate 4. The catching plate 4 moves towards left, the second inward protruding platform 422 of the catching plate 4 presses the on notch 83, and the protrusion 41 of the catching plate 4 moves towards left and is inserted into the key ways 12, such that the screw rod 1 cannot rotate, thereby locking the circuit breaker in the on position. If the positioning plate 8 moves backwards to the off notch 81, the traveling relation of the positioning plate 8, the catching plate 4, and the locking plate 6 is the same as the above mentioned process, so it will not be described again herein.

It may be known from the description of the embodiments of the present invention that in the position locking device for the circuit breaker of an embodiment of the present invention, the position locking is realized utilizing the screw rod, the catching plate, the positioning plate, and the push rod. The position locking of the circuit breaker is realized by using fewer members, so as to ensure the working reliability and lower the cost for manufacturing and installing. For example, if more locking positions are required, only the above-mentioned members need to be changed to achieve the objective, which facilitates the future modification. In addition, the locking plate matches the protruding platforms corresponding to the positioning notches and disposed on the bottom surface of the positioning plate, so as to lock the position more easily, therefore preventing the mis-operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A position locking device for a draw-out circuit breaker, comprising:
   a rotatable screw rod, including one end driving a drag plate and including at least two key ways;
   a catching plate, including a catching plate hole and a protrusion inserted into the key ways, and connected to a fixing plate through a tension mechanism;
   a positioning plate, including one end inserted into the catching plate hole and the other end connected to the drag plate, such that the positioning plate is driven by the drag plate to travel, wherein at least two positioning notches are formed on a top surface of the positioning plate; and
   a push rod including having a restoring mechanism, including one end disposed on a panel of the circuit breaker and the other end passing through the catching plate hole, and including an inclined surface, wherein at a time of pushing the push rod from the end disposed on the panel along an axial direction, the inclined surface makes the catching plate travel along a direction in which the protrusion leaves the key ways;
   wherein the catching plate further comprises an outward protruding platform, and the catching plate hole further comprises a first inward protruding platform bearing against the top surface of the positioning plate and a second inward protruding platform bearing against the positioning notches of the positioning plate.

2. The position locking device for a draw-out circuit breaker according to claim 1, wherein the device further comprises a locking plate connected to the fixing plate through a rotating mechanism, wherein a top surface of a first end of the locking plate bears against a bottom surface of the positioning plate, and a second end is capable of bearing against the outward protruding platform; and wherein protruding platforms corresponding to the positioning notches are further disposed on the bottom surface of the positioning plate, such that when one of the positioning notches is in the catching plate hole, the corresponding protruding platform presses the first end of the locking plate to cause the second end of the locking plate to leaves the outward protruding platform in of the catching plate, and when the positioning notches leave the catching plate hole, the first end of the locking plate is raised by the leaving from the protruding platform, which causes the second end of the locking plate to bear against the outward protruding platform of the catching plate.

3. The position locking device for a draw-out circuit breaker according to claim 1, wherein the restoring mechanism of the push rod is a spring, and the push rod returns to an initial position under an acting force of the spring.

4. The position locking device for a draw-out circuit breaker according to claim 1, wherein the tension mechanism of the catching plate is a spring, and the catching plate travels along a direction in which the protrusion is inserted into the key ways under an acting force of the spring.

5. The position locking device for a draw-out circuit breaker according to claim 2, wherein the restoring mechanism of the push rod is a spring, and the push rod returns to an initial position under an acting force of the spring.

6. The position locking device for a draw-out circuit breaker according to claim 2, wherein the tension mechanism of the catching plate is a spring, and the catching plate travels along a direction in which the protrusion is inserted into the key ways under an acting force of the spring.

7. The position locking device for a draw-out circuit breaker according to claim 3, wherein the tension mechanism of the catching plate is a spring, and the catching plate travels along a direction in which the protrusion is inserted into the key ways under an acting force of the spring.

8. The position locking device for a draw-out circuit breaker according to claim 5, wherein the tension mechanism of the catching plate is a spring, and the catching plate travels along a direction in which the protrusion is inserted into the key ways under an acting force of the spring.

9. A draw-out circuit breaker comprising the position locking device of claim 1.

* * * * *